(12) United States Patent
Van de Vosse et al.

(10) Patent No.: US 8,545,374 B2
(45) Date of Patent: Oct. 1, 2013

(54) SYSTEM AS WELL AS A MACHINING DEVICE, A CHUCK, A JAW CONNECTING ELEMENT, A JAW EXCHANGING DEVICE AND A METHOD

(75) Inventors: Gerhardus Van de Vosse, Deventer (NL); Joseph Hubert Johan Van der Linden, Drunen (NL)

(73) Assignee: Vosteq Innovations B.V. (NL)

( * ) Notice: Subject to any disclaimer, the term of this patent is extended or adjusted under 35 U.S.C. 154(b) by 400 days.

(21) Appl. No.: 12/947,596

(22) Filed: Nov. 16, 2010

(65) Prior Publication Data
US 2011/0115171 A1    May 19, 2011

(30) Foreign Application Priority Data
Nov. 16, 2009 (NL) ..................... 2003802

(51) Int. Cl.
*B23Q 3/155* (2006.01)
*B23B 31/39* (2006.01)

(52) U.S. Cl.
USPC .............. 483/20; 483/902; 279/124; 279/901

(58) Field of Classification Search
USPC .............. 483/20, 19, 32, 902; 279/124, 901, 279/900
See application file for complete search history.

(56) References Cited

U.S. PATENT DOCUMENTS

| | | | |
|---|---|---|---|
| 4,617,721 A * | 10/1986 | Jackson | 483/20 |
| 4,639,001 A * | 1/1987 | Berardo | 279/123 |
| 4,644,636 A | 2/1987 | Link et al. | |
| 4,969,654 A * | 11/1990 | Theodolin | 279/123 |
| 5,129,662 A * | 7/1992 | Kempken | 279/124 |
| 7,594,665 B2 * | 9/2009 | Crowley et al. | 279/124 |
| 2008/0217871 A1 | 9/2008 | Hildebrandt et al. | |
| 2009/0143206 A1 * | 6/2009 | Terazono et al. | 483/20 |

FOREIGN PATENT DOCUMENTS

| | | |
|---|---|---|
| DE | 3603459 A1 * | 8/1987 |
| EP | 1849556 | 10/2007 |
| EP | 1899099 | 9/2008 |
| EP | 2065110 | 6/2009 |
| JP | 59047106 | 3/1984 |
| JP | 60-255302 A * | 12/1985 |

OTHER PUBLICATIONS

International Search Report dated Jun. 28, 2010, for Netherlands Application No. 2003802, filed Nov. 16, 2009.

* cited by examiner

*Primary Examiner* — Erica E Cadugan
(74) *Attorney, Agent, or Firm* — Barnes & Thornburg LLP

(57) ABSTRACT

A system comprises a machining device which comprises at least one chuck and at least one jaw detachably connected to said chuck, as well as a jaw exchanging device cooperating with said machining device. The chuck is provided with at least one locking element which can be moved in a locking direction and in an opposite direction, from a jaw releasing position to a jaw locking position, and vice versa, by means of the jaw exchanging device. The jaw exchanging device is provided with moving means for moving the jaw with respect to the chuck in said releasing position. The chuck is provided with a rotatable operating pin extending transversely to the locking direction, by means of which the locking element can be moved from the releasing position to the locking position and vice versa. The jaw exchanging device is provided with a connecting element to be connected to the operating pin, by means of which connecting element the operating pin can be rotated.

7 Claims, 11 Drawing Sheets

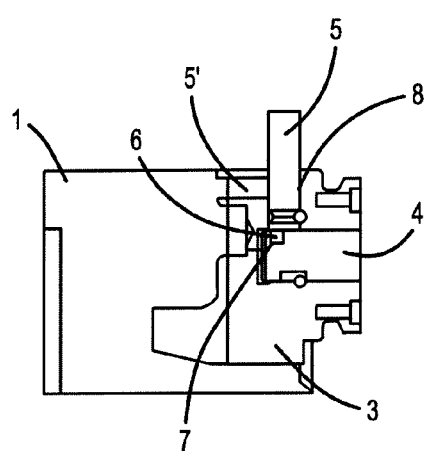
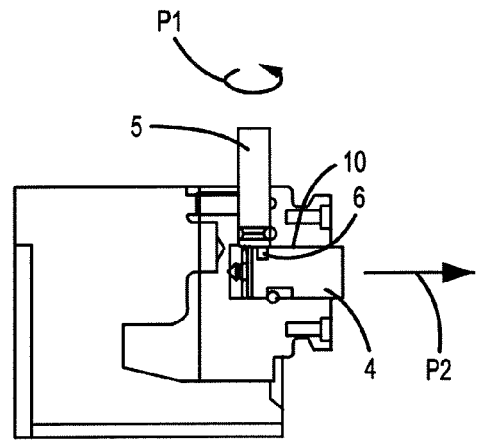
Fig. 2B
Fig. 3B
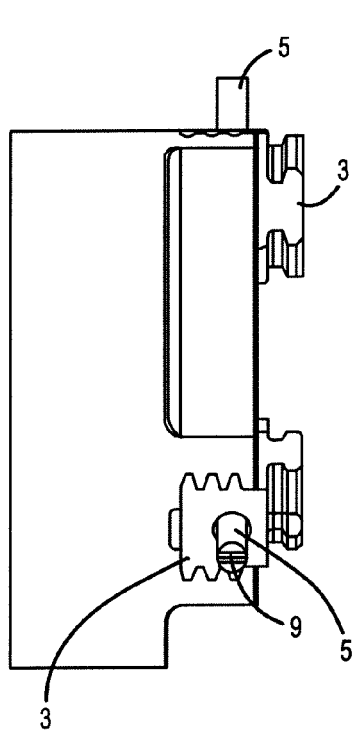
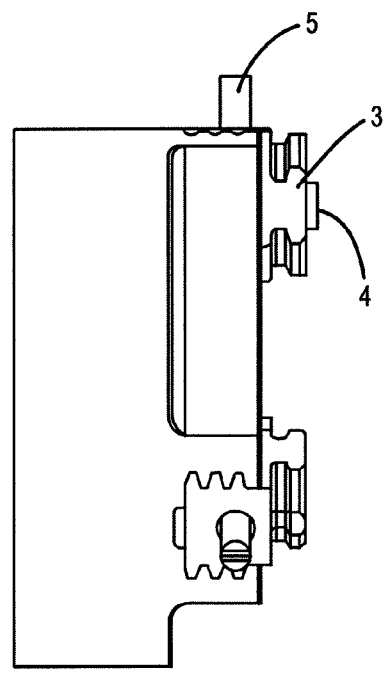
Fig. 2A
Fig. 3A

SYSTEM WHEREIN THE CONNECTING ELEMENT IS PROVIDED WITH A SLOT, AND ONE END OF THE OPERATING PIN IS PROVIDED WITH A STRIP TO BE POSITIONED IN THE SLOT

Fig. 13

SYSTEM AS WELL AS A MACHINING DEVICE, A CHUCK, A JAW CONNECTING ELEMENT, A JAW EXCHANGING DEVICE AND A METHOD

The invention relates to a system comprising a machining device which comprises at least one chuck and at least one jaw detachably connected to said chuck, as well as a jaw exchanging device cooperating with said machining device, which chuck is provided with at least one locking element which can be moved in a locking direction and in an opposite direction, from a jaw releasing position to a jaw locking position, and vice versa, by means of the jaw exchanging device, which jaw exchanging device is provided with moving means for moving the jaw with respect to the chuck in said releasing position.

The invention also relates to a machining device suitable for use in such a system, which machining device comprises at least one chuck and at least one jaw detachably connected to the chuck, which chuck is provided with at least one locking element which can be moved from a jaw releasing position to a jaw locking position, and vice versa.

The invention further relates to a chuck suitable for use in such a machining device, which chuck comprises at least one jaw detachably connected to said chuck.

The invention further relates to a jaw connecting element suitable for use in such a machining device, which jaw connecting element can be detachably connected to a chuck and which can be detachably connected to a jaw.

The invention also relates to a jaw exchanging device suitable for use in such a system, which jaw exchanging device is provided with moving means for moving a jaw with respect to a chuck.

The invention further relates to a method suitable for placing a jaw on and removing said jaw from a chuck of such a machining device by means of such a jaw exchanging device, wherein the jaw is connected to the chuck, after which the jaw and the chuck are locked together, and vice versa.

In such a system, which is known from European patent EP-B1-1 899 099, the locking element is movable against the spring force of a spring from a locking position to a releasing position. The jaw exchanging device comprises a positioning pin which extends through the jaw when the jaw is being connected to and removed from the chuck. The positioning pin supports the jaw. Said positioning pin is also used for pushing the locking element to the releasing position against spring force. Upon removal of the positioning pin, the locking element is moved to the locking position by the spring force of the spring.

A drawback of the known system is that if the spring no longer functions, for example because the spring has broken, or if the force exerted by the spring no longer suffices for moving the locking element to the locking position due to the presence of dirt between the locking element and the chuck, the jaw and the chuck are not locked together, which can lead to undesirable and even dangerous situations.

The object of the invention is to provide a system in which a jaw can be locked to and be unlocked from a chuck of a machining device in a reliable, automated manner, using a jaw exchanging device.

In the system according to the invention, this object is accomplished in that, the chuck is provided with a rotatable operating pin extending transversely to the locking direction, by means of which the locking element can be moved from the releasing position to the locking position, and vice versa, wherein the jaw exchanging device is provided with a connecting element to be connected to the operating pin on a side remote from the locking element, by means of which connecting element the operating pin can be rotated.

By rotating the operating pin it is guaranteed that the moving element will move in an unequivocal manner, ensuring that the jaw and the chuck will be properly locked together. When the locking engagement is released, the jaw is held by the moving means of the jaw exchanging device, so that the jaw, after being released, can be removed from the chuck by means of the jaw exchanging device. When the jaw is being connected to the chuck, the jaw is positioned opposite the chuck by the moving means of the jaw exchanging device. Then the operating pin is rotated by means of the jaw exchanging device, resulting in the locking element and the jaw being connected together. If rotation of the operating pin is not possible, this is detected by the jaw exchanging device, because rotation of the connecting element will not be possible either in that case. To the system this signifies that the jaw is not correctly locked in position. In such a situation the system must deliver a warning signal or stop automatically. Since the jaw can be reliably moved as well as locked by means of the jaw exchanging device, exchanging the jaw can take place in a fully automated manner, which renders the system suitable for use in an automated production process.

One embodiment of the system according to the invention is characterised in that a first part of the operating pin is positioned in a passage in the chuck, whilst a second part, which can be connected to the connecting element of the jaw exchanging device, extends from said passage.

Since the operating pin extends from said passage, the operating pin will be readily accessible at all times. Since the second part of the operating pin extends from the passage, said second part will be easily visible and the position of the locking element can be deduced from the position of said second part.

It is noted that an operating pin positioned in a passage is known from a chuck plate known from European patent EP-B1-1 899 099. Said operating pin is rotated by means of a manually operated key, which key must be inserted into the passage. A drawback of the known chuck is the fact that if the passage gets clogged by dirt, the key can no longer be connected to the operating element and the operating element can no longer be rotated, therefore.

Another embodiment of the system according to the invention is characterised in that one end of the operating pin is provided with a slot, whilst the connecting element is provided with a strip to be positioned in the slot, or conversely.

The strip to be positioned in the slot provides a simple yet effective connection between the connecting element and the operating pin.

Yet another embodiment of the system according to the invention is characterised in that the jaw exchanging device is provided with a checking device for checking at least the presence of the jaw on the jaw exchanging device and/or the orientation of the operating pin.

In this way the reliability of the system is further enhanced.

Another embodiment of the system according to the invention is characterised in that the moving means of the jaw exchanging device are provided with at least two grippers for engaging the jaw.

Using such grippers, a jaw can be gripped in a simple and reliable manner.

Yet another embodiment of the system according to the invention is characterised in that the jaw exchanging device is provided with a cleaning element for cleaning at least the operating pin and/or the jaw.

By automatically cleaning the jaw and the operating pin, preferably before a jaw is connected or removed, the reliability of the connection between the grippers and the jaw and the connection between the connecting element and the operating pin is further enhanced.

Yet another embodiment of the system according to the invention is characterised in that the chuck comprises at least one jaw connecting element detachably connected to the chuck, which jaw connecting element at least comprises said locking element and said operating pin.

Using such a detachable jaw connecting element, the spacing between the jaw connecting elements, and thus the spacing between the jaws to be connected thereto, can be adjusted in a simple manner.

The invention will now be explained in more detail with reference to the drawing, in which:

FIGS. 2A and 2B are a side view and a cross-sectional view, respectively, of the chuck shown in FIG. 1 with the locking element in the releasing position;

FIGS. 3A and 3B are a side view and a cross-sectional view, respectively, of the chuck shown in FIG. 1 with the locking element in the locking position;

FIG. 13 shows an alternative arrangement wherein the connecting element is provided with a slot, and one end of the operating pin is provided with a strip to be positioned in the slot.

Like parts are indicated by the same numerals in the figures.

Figure 1:
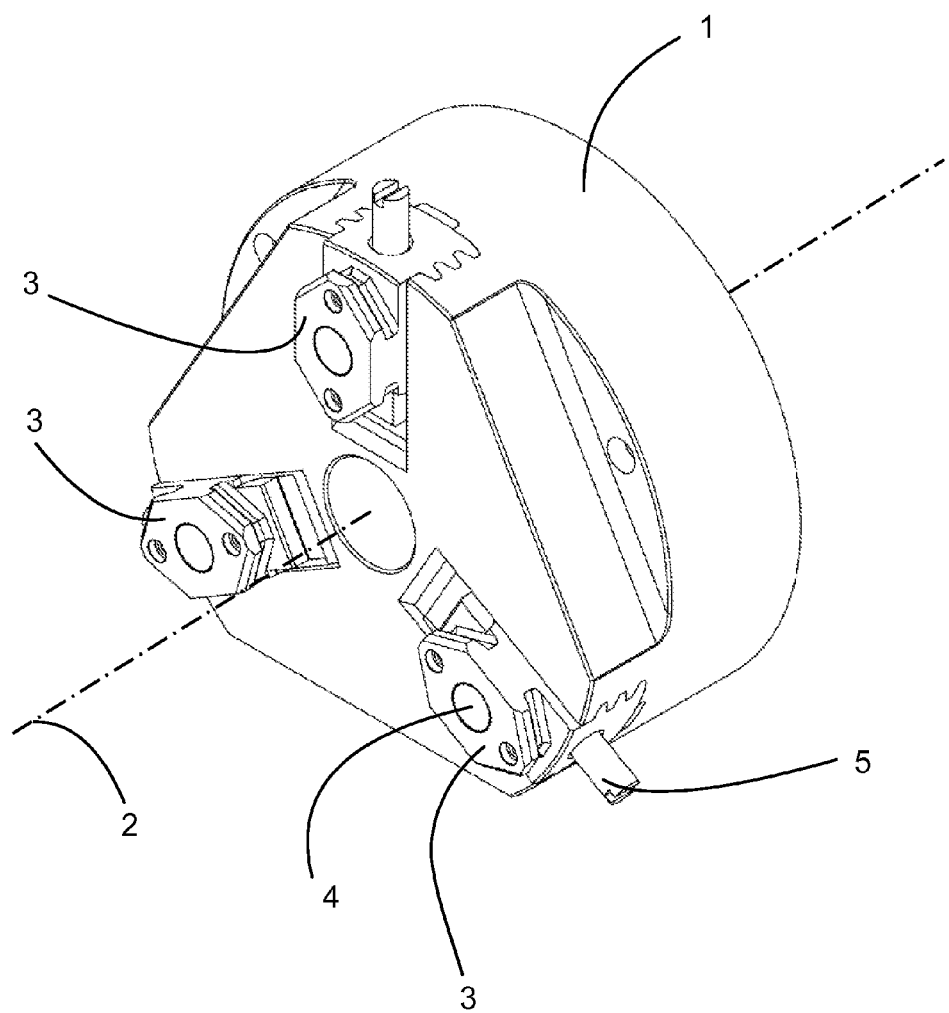
FIG. 1 is a perspective view of an embodiment of a chuck of a machining device according to the invention.

FIGS. 1-3B are views of a chuck 1 of a machining device according to the invention. The machining device is a lathe, for example, in which a workpiece is clamped by means of the chuck 1, after which the chuck 1 is rotated about the central axis 2 and the workpiece is subjected to a machining operation.

The chuck 1 is provided with three evenly spaced jaw connecting elements 3, which are detachably connected to the chuck 1. Each jaw connecting element 3 is provided with a pin-shaped locking element 4, which extends parallel to the central axis 2, and an operating pin 5, which extends transversely thereto. The operating pin 5 is provided with an eccentrically positioned pin 6 at a first end thereof, which pin 6 is in engagement with a recess 7 in the locking element 4. The operating pin 5 is rotatably journalled in a passage 8 in the jaw connecting element 3. The operating pin 5 is locked in the direction of rotation in the releasing position and in the locking position by a pressure element 5' which is movable against spring force. The pressure element 5' comprises a ball, which is forced into a recess of the operating pin 5 associated with the releasing position and the locking position, respectively. A part of the operating pin 5 comprising the second end is positioned outside the passage 8. Said second end is provided with a slot 9 extending transversely to the central axis of the operating pin 5.

The locking element 4 is slidably accommodated in a passage 10 in the jaw connecting element 3.

In the position of the operating pin 5 that is shown in FIGS. 2A and 2B, the pin 6 is located to the left of the central axis of the operating pin 5, so that the locking element 4 is likewise located on the left-hand side of the passage 10 and is fully accommodated within the jaw connecting element 3. The locking element 4 is now in the releasing position. The slot 9 of the operating pin 5 extends parallel to the central axis 2.

In the position of the operating pin 5 that is shown in FIGS. 3A and 3B, the operating pin 5 has been rotated through 180 degrees in the direction indicated by the arrow P1 relative to the position shown in FIGS. 2A and 2B, whilst the locking element 4 has been moved in the direction indicated by the arrow P2, parallel to the central axis 2, by the pin 6 located in the recess. One end of the locking element 4 is now positioned outside the passage 10, and the locking element 4 is in the locking position.

The slot 9 of the upper operating pin 5, seen in FIGS. 3A and 3B, extends parallel to the central axis 2.

The end of the operating pin 5 provided with the slot 9 is preferably provided with a marking element, such as a projecting pin, a bevelled surface, an unevenness, a colour mark, by means of which it can be ascertained whether the operating pin 5 is in the releasing position or in the locking position.

Figure 4A:
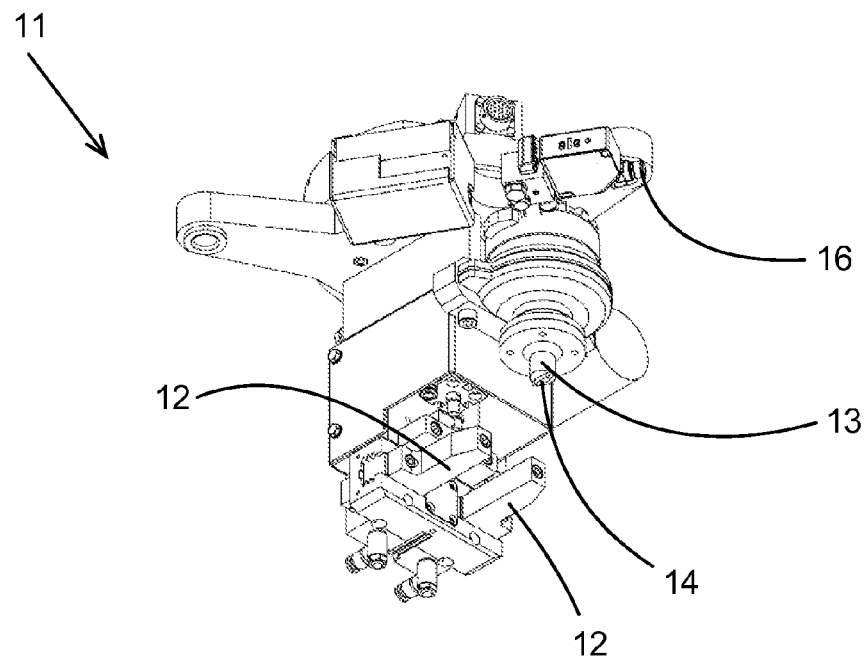
FIGS. 4A-4E are various views of an embodiment of a jaw exchanging device according to the invention.
Figure 4B:
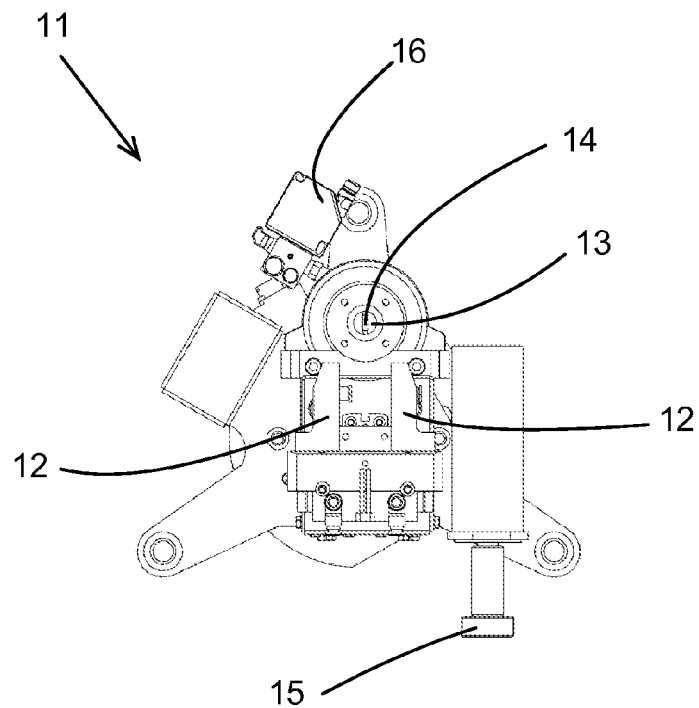
Figure 4C:
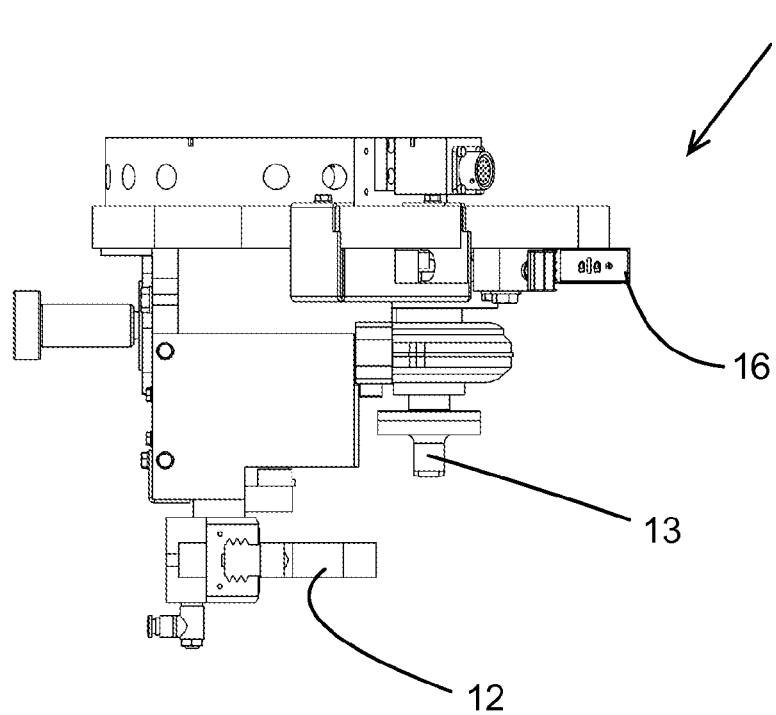
Figure 4D:
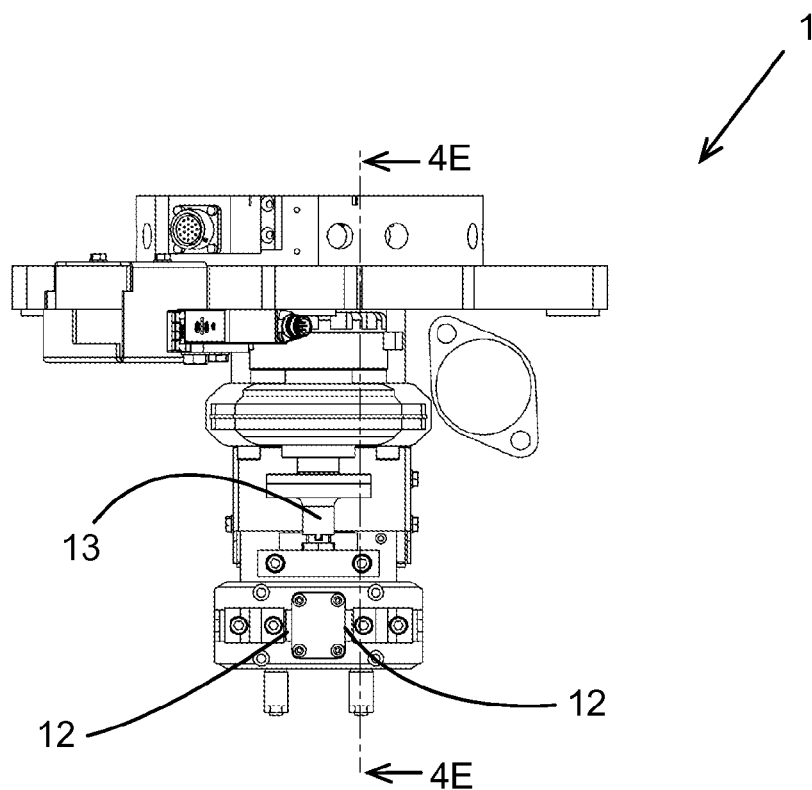
Figure 4E:
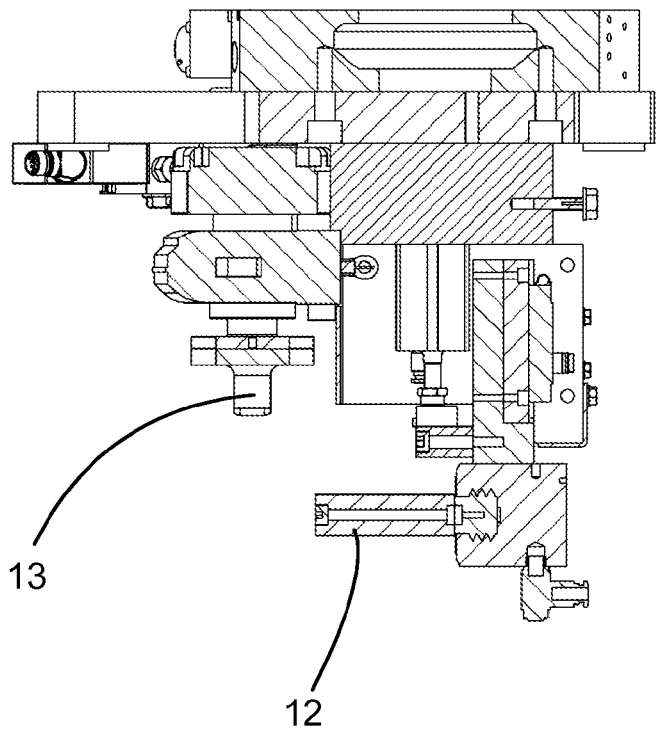

FIGS. 4A-4E show various views of an embodiment of a jaw exchanging device 11 according to the invention, with FIG. 4A showing a perspective view, FIG. 4B showing a bottom view, FIGS. 4C and 4D showing different side views and FIG. 4E showing a cross-sectional view along the line 4E-4E. The jaw exchanging device 11 comprises two grippers 12, a rotatable connecting element 13, which is provided with a strip 14 at one end, a cleaning element 15 comprising a rotatable brush, and a checking device 16 comprising a laser, by means of which the distance to an object can be measured. The grippers 12 can be moved towards and away from each other for clamping a jaw therebetween.

The operation of the system according to the invention, which comprises the machining device and the jaw exchanging device that co-operates therewith, is as follows. The starting point is a situation in which the chuck 1 is not provided with jaws 17.

Figure 5:
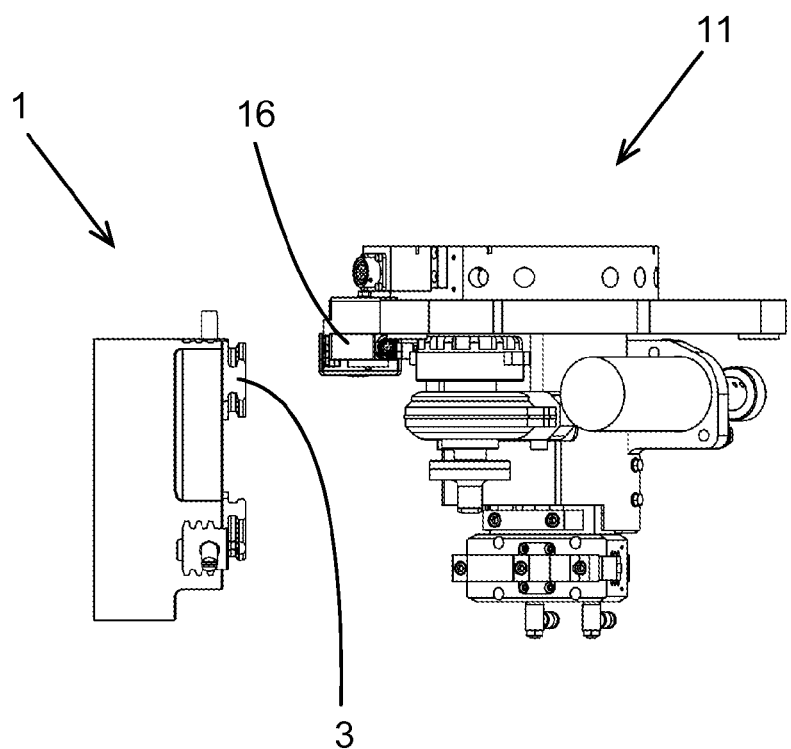
FIGS. 5-9b show various steps of the method according to the invention, in which a jaw is connected to the chuck from an outer side of the chuck.

In the relative position of the chuck 1 and the jaw exchanging device 11 that is shown in FIG. 5, the chuck 1 has been rotated about the central axis 2, so that a jaw connecting element 3 is located at the upper side of the chuck 1 and the operating pin 5 thereof extends in vertical direction. The jaw exchanging device 2 has been moved and rotated about a vertical axis, for example by means of a robot, so that the checking device 16 is positioned opposite the jaw connecting element 3. Using the laser of the checking device 16, it is checked whether no jaw 17 is present on the jaw connecting element 3. It is also checked whether the locking element 4 is in the releasing position. This can for example be done on the basis of the position of the operating pin 5.

Figure 6:
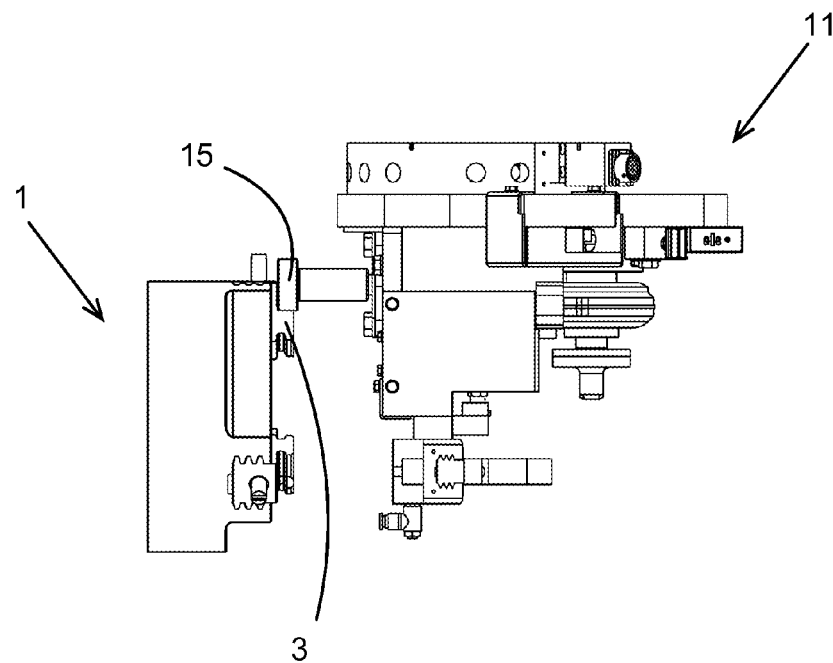

If the outcome of the checking step is positive, the jaw exchanging device 11 will be rotated about the vertical axis until the cleaning element 15 is positioned opposite the jaw connecting element 3. The jaw connecting element 3 is cleaned by means of the brush, which is rotatable about an axis that extends parallel to the central axis 2. Said cleaning step may involve movement only of the cleaning element 15 or of the entire jaw exchanging device 11 relative to the jaw connecting element 3, so that the entire outer side thereof can be adequately cleaned (see FIG. 6).

Figure 7:
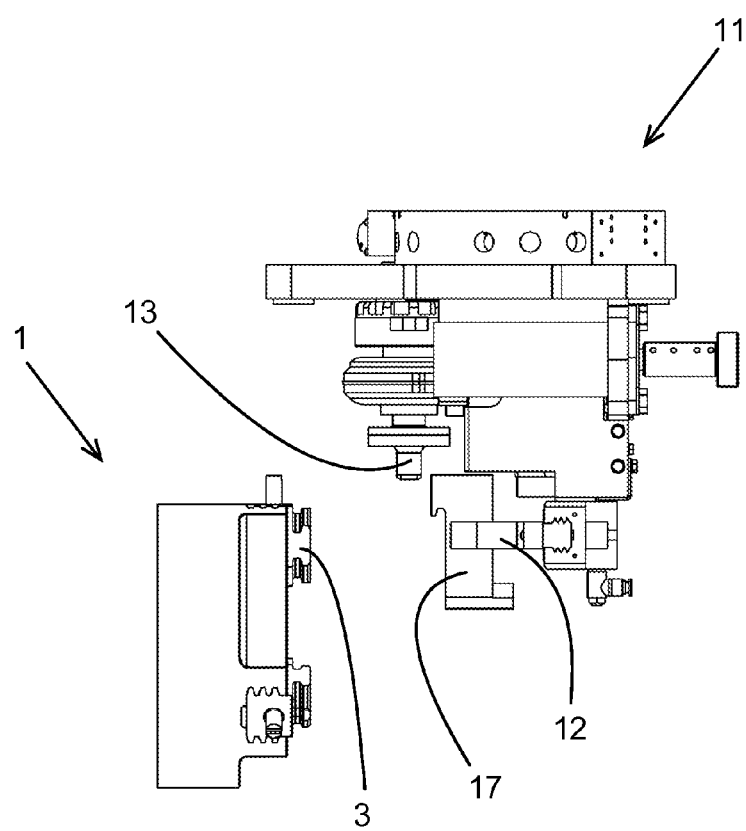

In FIG. 7 a next step is shown, in which the jaw exchanging device 11 has again been rotated so far about the vertical axis that the grippers 12 are now positioned opposite the jaw connecting element 3. A jaw 17 is clamped between the grippers 12.

Figure 8A:
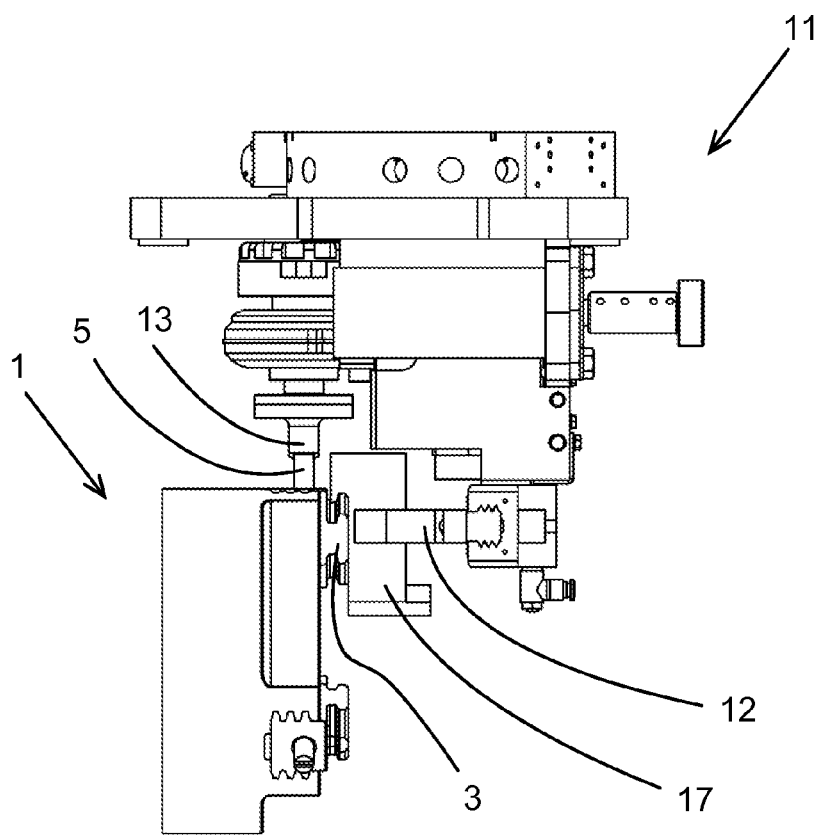
Figure 8B:
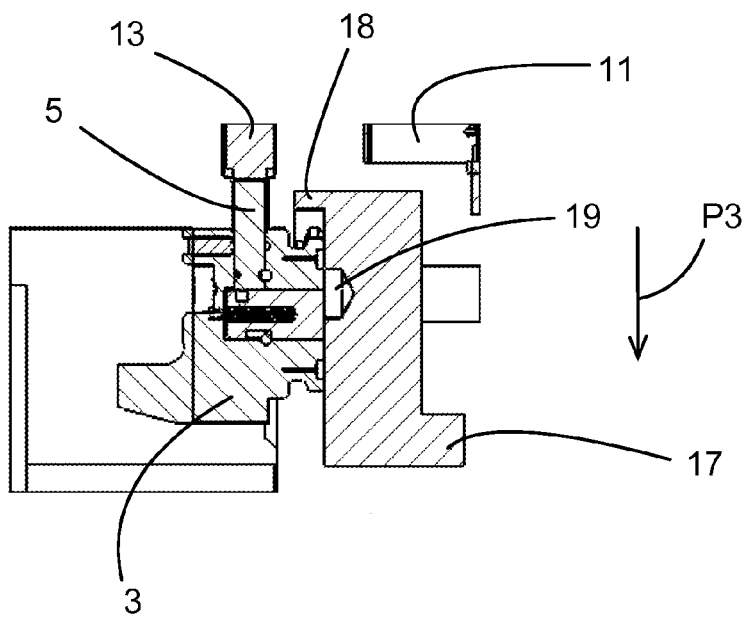

In FIGS. 8A and 8B, the jaw 17 is shown to have been positioned opposite the jaw connecting element 3 with an engaging edge 18 thereof by means of the grippers 12. The engaging edge 18 is now positioned opposite a side of the jaw connecting element 3 that is located on the outer side of the chuck 1. The connecting element 13 can be moved independently of the grippers 12 and the connecting element 13 has been connected to the operating pin 5 in the step shown in FIG. 8, in which the strip 14 has been brought into engagement with the slot 9 in the operating pin 5. The locking element 4 is in the releasing position. Preferably, the strip 14 is being slit in the slot 9, so that by placing the strip 14 in the slot 9, possible dirt present in the slot 9 will be slit out of the slot 9.

Figure 9A:
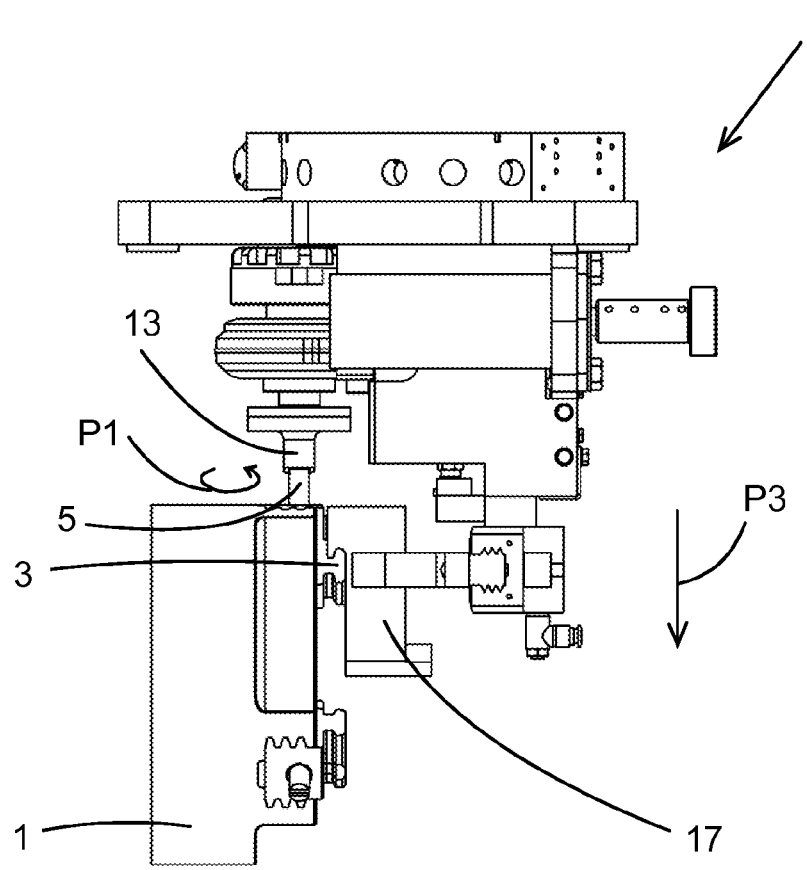
Figure 9B:
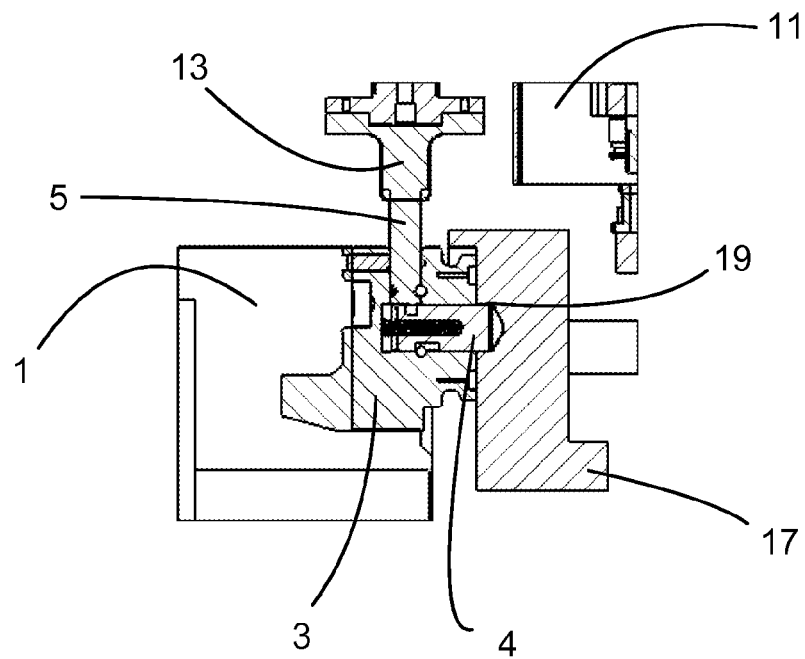
Figure 10:
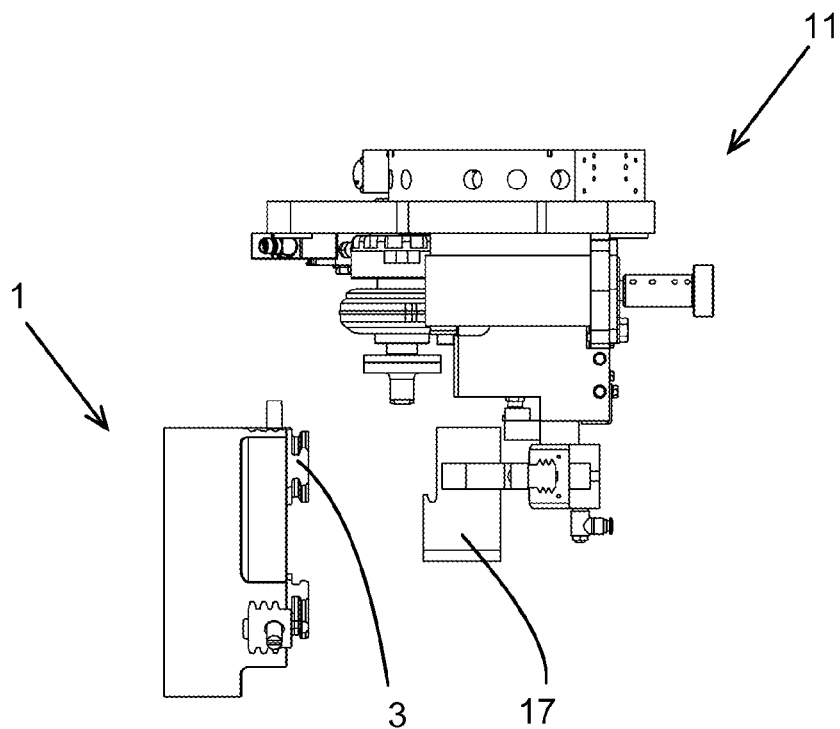
FIGS. 10-12 show various steps of the method according to the invention, in which a jaw is connected to the chuck from the central axis of the chuck.
Figure 11:
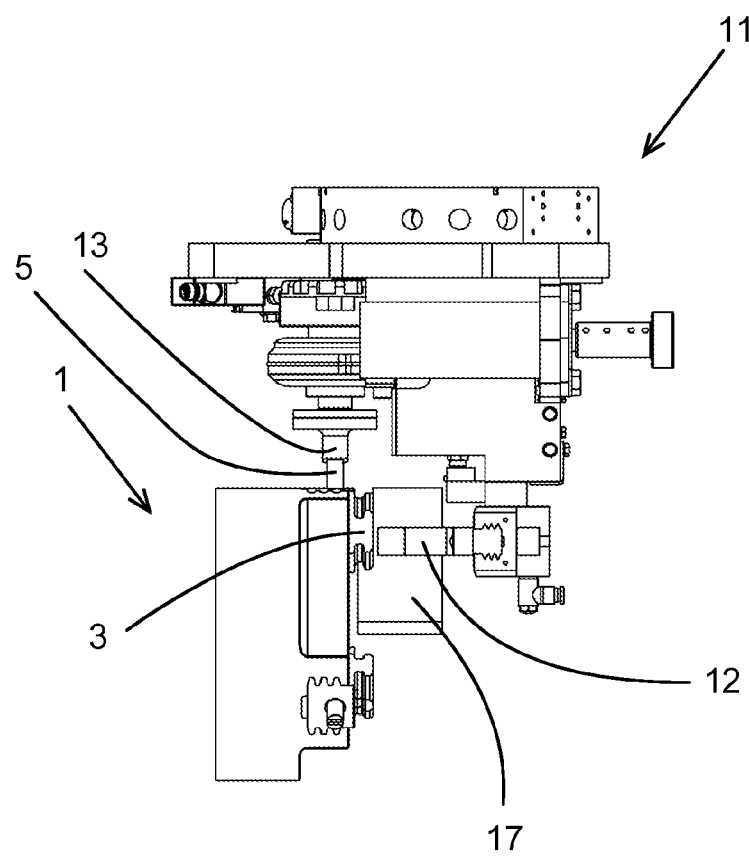
Figure 12:
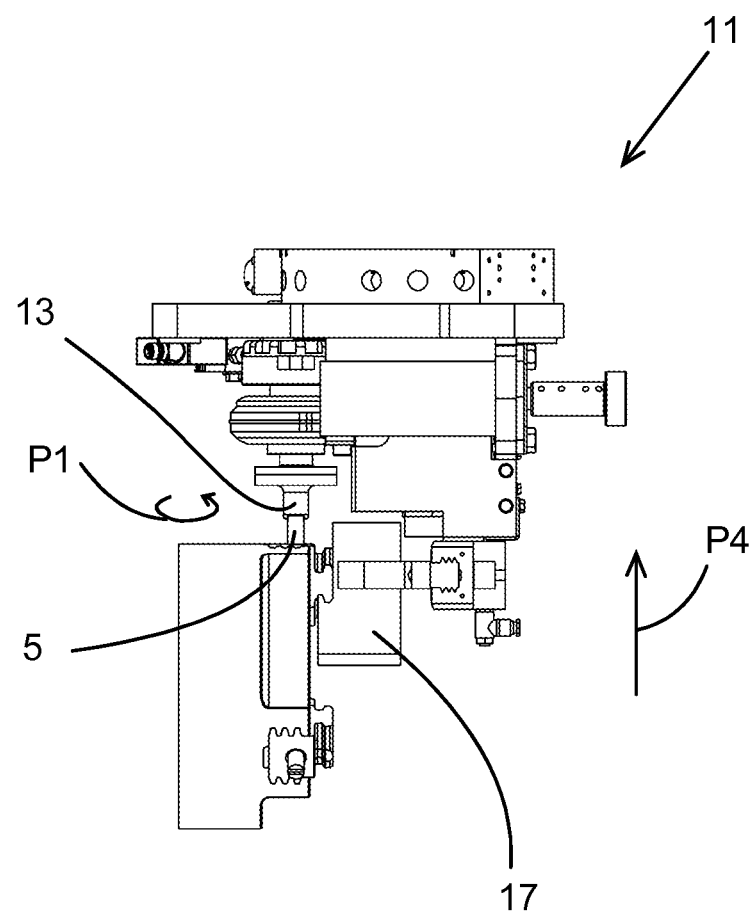

In the situation shown in FIGS. 9A and 9B, the jaw exchanging device 11 is shown to have moved the grippers 12 with the jaw 17 in the direction indicated by the arrow P3, bringing the jaw 17 into engagement with the jaw connecting element 3. The connecting element 13 is then rotated in the direction indicated by the arrow P1, as a result of which the operating pin 5 connected thereto is rotated as well and the locking element 4 is moved from the releasing position to the locking position. In the locking position, the locking element 4 is located in an opening 19 provided in the jaw 17 for that purpose.

The grippers 12 are then opened, whereupon a next jaw is picked up from a magazine by means of the jaw exchanging device 11. The chuck 1 is rotated through 120 degrees about the central axis, after which a second jaw and then a third jaw 17 are connected to the chuck 1 by carrying out the steps indicated in FIGS. 5-9B. Removing the jaws 17 takes place in a comparable manner, wherein the orientation of the chuck 1 is checked, the jaw 17 is gripped, the locking element 4 is released and the jaw 17 is removed.

The invention claimed is:

1. A system comprising a machining device, which system comprises
   at least one chuck, and
   at least one jaw detachably connected to said at least one chuck, as well as
   a jaw exchanging device cooperating with said machining device,
   which at least one chuck is provided with at least one locking element which can be moved in a locking direction and in an opposite direction, from a jaw releasing position wherein the at least one jaw is released from the at least one chuck, to a jaw locking position wherein the at least one jaw is locked to the at least one chuck, and vice versa, by means of the jaw exchanging device,
   which jaw exchanging device is provided with gripping and moving means for gripping and moving the at least one jaw with respect to the at least one chuck selectively into and out of contact with the at least one chuck when the at least one locking element is in said releasing position,
   wherein the at least one chuck is provided with a rotatable operating pin rotatable with respect to the at least one chuck about an axis extending transversely to the locking direction, by means of which operating pin rotation the at least one locking element can be moved from the releasing position to the locking position, and vice versa,
   wherein the jaw exchanging device is provided with a connecting element rotatable about the axis and configured to be connected to the operating pin on a side of the operating pin remote from the at least one locking element, by means of which connecting element the operating pin can be rotated about the axis, and
   wherein the gripping and moving means includes at least two grippers for gripping the at least one jaw therebetween, which grippers are movable towards and away from each other in directions transverse to the axis about which the connecting element and operating pin rotate.

2. A system according to claim 1, wherein a first part of the operating pin is positioned in a passage in the at least one chuck, whilst a second part of the operating pin, which second part can be connected to the connecting element of the jaw exchanging device, extends from said passage.

3. A system according to claim 1, wherein one end of the operating pin is provided with an operating pin slot, whilst the connecting element is provided with a connecting element strip to be positioned in the operating pin slot, or conversely wherein the connecting element is provided with a connecting element slot, whilst one end of the operating pin is provided with an operating pin strip to be positioned in the connecting element slot.

4. A system according to according to claim 1, wherein the jaw exchanging device is provided with a checking device for checking at least the presence of the at least one jaw on the jaw exchanging device and/or an orientation of the operating pin.

5. A system according to according to claim 1, wherein the operating pin rotates by 180 degrees in order to move the at least one locking element between the jaw releasing position and the jaw locking position.

6. A system according to according to claim 1, wherein the jaw exchanging device is provided with a cleaning element for cleaning at least the operating pin and/or the at least one jaw.

7. A system according to according to claim 1, wherein the at least one chuck comprises at least one jaw connecting element detachably connected to the at least one chuck, which at least one jaw connecting element at least comprises said at least one locking element and said operating pin.

\* \* \* \* \*